No. 808,426. PATENTED DEC. 26, 1905.
C. W. ADSIT.
CUSHIONED TIRE.
APPLICATION FILED MAR. 3, 1905.
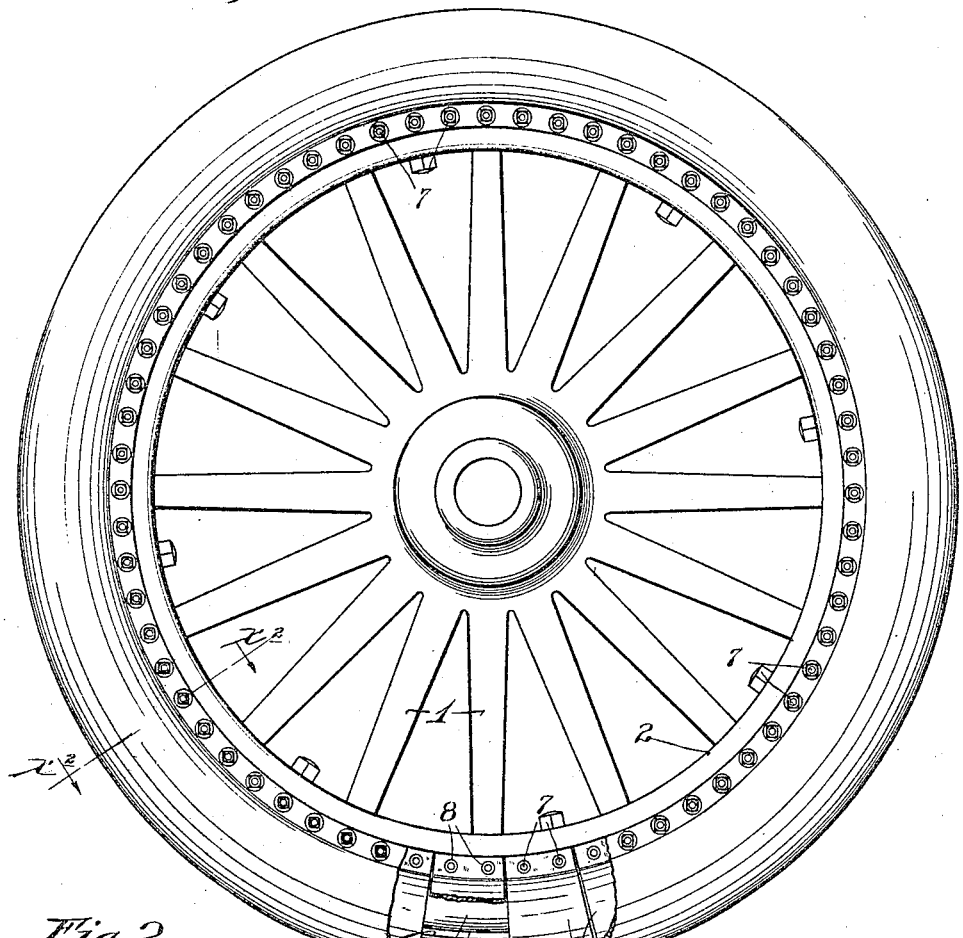
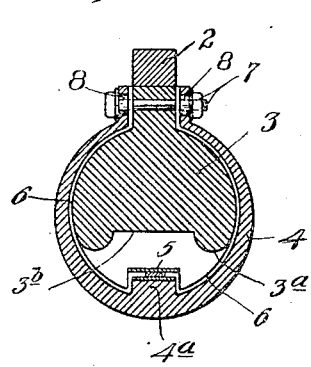
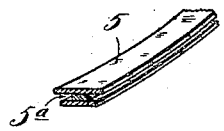
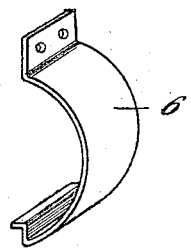
Witnesses.
E. W. Jeppesen
A. H. Opsahl
Inventor:
C. W. Adsit.
By his Attorneys.
Williamson Merchant

UNITED STATES PATENT OFFICE.

CHARLES W. ADSIT, OF OWATONNA, MINNESOTA.

CUSHIONED TIRE.

No. 808,426.  Specification of Letters Patent.  Patented Dec. 26, 1905.

Application filed March 3, 1905. Serial No. 248,202.

*To all whom it may concern:*

Be it known that I, CHARLES W. ADSIT, a citizen of the United States, residing at Owatonna, in the county of Steele and State of Minnesota, have invented certain new and useful Improvements in Cushioned Tires; and I do hereby declare the following to be a full, clear, and exact description of the invention, such as will enable others skilled in the art to which it appertains to make and use the same.

My invention relates to spring-cushion tires as distinguished from pneumatic tires, and has for its object to provide a tire of the character indicated which will meet the requirements both of bicycle and automobile service and generally of all vehicle service requiring cushioned tires.

To the above ends the invention consists of the novel devices and combinations of devices hereinafter described, and defined in the claims.

Figure 1 is a view in elevation with some parts broken away, showing a wheel having a tire designed in accordance with my invention. Fig. 2 is a section on the line 2 2 of Fig. 1. Fig. 3 is a perspective view, showing a short section of an endless coupling-hoop which forms a part of the device, and Fig. 4 is a perspective view of one of the springs.

The numeral 1 indicates a wheel of the character used on automobiles. This wheel, as shown, is provided with a felly 2, to which is rigidly secured by nutted bolts or otherwise a supplemental felly or rim 3, preferably formed of wood, the cross-section of the inner portion thereof being approximately semicircular and the outer portion thereof being rounded inward at $3^a$ and formed with a peripheral channel $3^b$, as best shown in Fig. 2.

The tire proper is made up of an outer sheath 4, an inner coupling-hoop 5, and a plurality of approximately semicylindrical spring plates 6. The endless coupling-hoop 5 is formed in its opposite edges with endless channels $5^a$ and is preferably constructed of spring-steel properly tempered. It may be formed or made up of three spring-hoops, riveted or otherwise rigidly secured together to form the channeled coupling-hoop described.

The semicylindrical spring-plates 6 at their upper ends are bent to fit the inner flange of the supplemental felly or rim 3, and through the same and the said felly-flange are passed nutted bolts 7. The lower edges of the said spring-plates 6 are bent upward with respect to Fig. 2 or inward with respect to the wheel and are then bent laterally to form edges which are adapted to enter the edged channels of the coupling-hoop 5.

The sheath 4, which may be constructed either of rubber, of compositions involving rubber and canvas, or other flexible material, surrounds and incloses the spring-plates 6, and the inner edges thereof are held to the felly 3 by the nutted bolts 7. To prevent excessive pressure on the secured edges of the sheath 4, flanged spacing-thimbles 8 are preferably placed on the bolts 7 and passed through the flanges of the sheath.

The sheath 4 at its running face is provided with an internal circumferential rib $4^a$, that fits the channel formed between the inturned ends of the springs 6. This rib $4^a$ prevents the sheath from slipping transversely on the sectional spring-tube made up of the springs 6 when the vehicle slues sidewise.

When the spring-plates 6 are applied in working position, as shown, they make up an approximately continuous resilient tube within the sheath 4 and all of the said spring-sections are interlocked with the spring acting or resilient coupling-hoop 5. In virtue of this interlocking action between the said coupling-hoop and the said spring plates or segments the tendency to compress those spring plates or sections, which are turned down to the ground, is resisted more or less by all of the springs and to a very considerable extent by a very large number of the said springs, and also by the spring-hoop itself. The said hoop is normally held in a true circle by the conjoint action of all of the springs 6, and any tendency to force the said coupling-hoop out of the lines of a true circle will be resisted by all of the said springs. Hence a tire of very great resiliency is afforded and the strain is distributed in such manner that no very great strains will ever be applied to any one spring.

By this device I believe I have provided a tire which will have all of the advantages or desirable features of a pneumatic tire, but which will be free from the limitations thereof, the most notable of which is the frequent disablement by puncture. As is evident, punctions through the sheath of my improved tire will have no effect whatever on the action of the tire. From what has been said it will be understood that the device described is capable of modification within the scope of my invention as herein set forth and claimed.

What I claim, and desire to secure by Letters Patent of the United States, is as follows:

1. The combination with a wheel-rim 3, of the two series of spring-plates 6 detachably clamped to said rim and making up a resilient sectional tube, a spring-hoop 5 having grooved edges with which the inturned ends of said spring-plates interlock, and a sheath inclosing said rim 3, spring-plates 6 and spring-hoop 5, and having its edges clamped to said rim, substantially as described 2. The combination with a ring 3 which is approximately semicircular in cross-section and has a circumferential groove formed between laterally-spaced rounded ribs, of a pliable sheath inclosing said rim and secured to the upper portion thereof, a plurality of springs located within said sheath, embracing the said rim and forming a resilient tube, substantially as described.

In testimony whereof I affix my signature in presence of two witnesses

CHARLES W. ADSIT.

Witnesses:
S. E. HONCE,
J. F. FITZGERALD.